Patented Nov. 14, 1950

2,530,355

UNITED STATES PATENT OFFICE 2,530,355

CATALYTIC PLASTICIZERS FOR NATURAL AND SYNTHETIC RUBBER

Edwin Oscar Hook, Old Greenwich, Conn., assignor to American Cyanamid Company, New York, N. Y., a corporation of Maine No Drawing. Application November 6, 1948,
Serial No. 58,797

8 Claims. (Cl. 260—30.8)

This invention relates to a method of shortening the required time of plasticizing those natural rubbers and vulcanizable synthetic rubber-like polymers and copolymers which are plasticized by oxygen; to the materials so plasticized and to a novel type of catalytic plasticizing or "peptizing" agent for the purpose.

In the manufacture of rubber goods, efficient processing, i. e., milling, calendering, extruding, molding and the like, requires that the rubber be plasticized. This is done in order that production schedules can be met with fewer defective products and with reasonable charges for power, labor and equipment. As a consequence, the plasticizing of rubber has become in itself a highly developed art.

Early in the development of the art it was found that most of the natural rubbers can be plasticized by the action of air or oxygen under suitable conditions. Most commonly this was done by heating while mechanically working in the presence of air. The action has been shown to be due to an oxidation reaction. Later it was found that small amounts of added chemicals, such as some of the aromatic mercaptans and certain nitroso compounds, could be added to rubber under various conditions to produce more rapidly the desired effect. While the exact nature of their action is not completely understood, the use of such catalytic plasticizers or "peptizers" has become well known.

In the past, the available plasticizers have been objectionable from one or more of several different causes. The principal difficulty with many of the materials proposed for the purpose was that they also operated as either skin irritants or skin sensitizers, resulting in objections from those who are obliged to handle the material. Other materials were characterized by very disagreeable odors. Many of the commonly used materials were subject to both. As a result of these objectionable features, the use of plasticizers tended to be limited in spite of the wide demand for materials for the purpose.

When additional problems arose of handling synthetic rubberlike polymers, such for example as the vulcanizable copolymers of butadiene and styrene or of butadiene and acrylonitrile, processing difficulties became much more pronounced. Many of the synthetic rubbers were found to be much more difficult to plasticize than natural rubber. Therefore, the demand for effective plasticizers or "peptizers," not subject to the objectionable physiological properties of the materials previously used, was markedly increased.

It is, therefore, the principal object of the present invention to develop plasticized rubber compositions which are not subject to the objectionable features such as those which characterized the materials of the prior art. It is also an object of the invention to develop plasticizers or peptizers which are: easily and readily obtained; do not possess or impart objectionable odors; in the handling, do not produce a sensitization or irritation of the skin; and are suitable for use with any natural and synthetic rubber-like polymers capable of being plasticized by oxidation. A still further and not the least important object of the present invention is to develop milling procedures using the new peptizers whereby the time consumed may be either less than the time required under previous practices or in which a softer rubber can be prepared in the same time.

These novel catalytic agents may be represented generically by the type formula

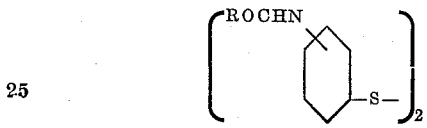

wherein ROC is the residue of a heterocyclic carboxylic acid. While R may be any five- or six-membered, mononuclear, heterocylic radical, in this invention ROC will be preferably selected from the group of the thenoyl, furoyl, and nicotinoyl radicals.

Reaction may be carried out simply by adding an acid chloride of the heterocyclic carboxylic acid to a solution of the diaminodisulfide in a suitable solvent such as pyridine. When addition is complete, and the mixture is at about room temperature, it is drowned in water. The product separates out, generally, but not necessarily, as an oil which soon solidifies or crystallizes. This product is then collected and purified either by distillation or crystallization.

While there appears to be no predictable basis for the activity possessed by these compounds as a class, the desired peptizing properties appear to be most noticeable in the type wherein the (—NHCO—R) substituent is in the ortho-position. Particularly active compounds appear to be those wherein ROC is a heterocyclic radical selected from the group of the thenoyl, furoyl, and nicotinoyl radicals.

These novel compounds have the desired plasticizing effect on both natural and synthetic rubbers without being subject to the characteristic objectionable odor of those materials previously used. They appear to be particularly free from objection as producing dermatitis conditions. Oddly enough, the plasticizing action appears to be quite specific to the particular molecular structure. Particularly is this true of the location of the carboxyamino group. In the ortho position it is a much better plasticizer than in the para position. While the para position materials may be used, as was noted above, the o,o'-derivatives are to be preferred.

An advantage of the materials of the present invention is that only small amounts are required. Generally, this will constitute from about 0.025% by weight of the hydrocarbon, which is an effective amount with many natural rubbers, up to about 5%, which may be required for particularly stubborn copolymers such as some of those of butadiene-1,3 and acrylonitrile. The range required for a particular polymer or copolymer will vary somewhat with the nature of the material as has been shown. For example, with natural rubber, amounts as little as 0.025% are useful although up to about 1.0% may be required. Generally, the range of from 0.125 to 0.5% by weight will be preferred for the average natural rubber. By way of contrast, a copolymer such as that of butadiene-1,3 and styrene may require about 0.5 to 3.0%, depending upon the proportions in the copolymer and the compounding materials which may have been added or may be subsequently added. Butadiene-1,3 and acrylonitrile copolymers may require even more, in the range of from 0.5 to 5%.

It is a further advantage of the present invention that it is applicable to all vulcanizable polymers plasticizable by oxidation. This will include the natural and many synthetic rubber-like materials. For example, natural rubbers, such as Hevea Braziliensis and similar types and guayule may be readily treated and softened. Synthetic, rubber-like, polymers of butadiene-1,3 and copolymers of a butadiene-1,3 with other polymerizable compounds are also readily plasticized by incorporating therein the di(carbalkoxyamino)-diphenyldisulfides of the present invention. Examples of synthetic rubber-like polymers of a butadiene-1,3 include those of butadiene-1,3; methyl-2-butadiene-1,3 (isoprene); chloro-2-butadiene-1,3 (chloroprene); piperylene and 2,3-dimethylbutadiene-1,3. Illustrative copolymers include those of a butadiene-1,3 with polymerizable compounds which contain an olefinic group ($-CH_2=CH-$) wherein at least one of the disconnected valences is attached to a group which increases the polar character of the molecule. Examples of such compounds include aryl olefins, such as styrene and vinyl naphthalene or the alpha-methylene carboxylic acids, their esters, nitriles, and amides such as acrylic acid, methyl acrylate, methylmethacrylate, acrylonitrile methacrylonitrile, methacrylamide; isobutylene; methyl vinyl ether; methyl vinyl ketone; and vinylidene chloride. The better-known, commercially-developed types of these synthetic rubbers are polymerized chloro-2-butadiene-1,3, known as "Neoprene" or "GRM" rubber; copolymers of butadiene-1,3 and styrene, known as "Buna S" or "GRS" rubber; and copolymers of butadiene-1,3 and acrylonitrile, known as "Buna N" or "GRA" rubber. The expression "a rubber" as used herein refers to such natural and artificial rubbers.

Temperatures required for carrying out the plasticizing operation usually run somewhat above about 100°–115° C., using the recommended amounts of plasticizer in natural rubbers. There are some cases where slightly higher temperatures are necessary. With some rubbers as high as about 165° C. may be required.

Plasticizing is readily carried out with standard equipment, such as open mills, Gordon plasticators, Banbury-type mixers of conventional design or any other suitable milling equipment. It is also possible to mill the plasticizer into the rubber at temperatures below those at which the plasticizer is active during milling. For example, the plasticizer may be incorporated into the compositions by milling at temperatures below 100° C. until it is fairly uniformly dispersed or disseminated therein. Subsequently, a short period of heating, as for example in an oven at about 100°–165° C. will affect plasticization.

In general, the plasticizing of the rubber or synthetic rubber should be carried out before the compounding into a vulcanizable mixture is done. Many of the commonly-used fillers, reinforcing agents, pigments and the like, i. e., carbon black, sulfur, etc., have an inhibiting effect on the plasticizing action. The plasticized elastomer may be compounded and vulcanized in any of the conventional methods required for the manufacture of the finished rubber goods.

Plasticity of a composition is not easily defined. It may be conveniently measured by the use of the Williams plastomer described in the "Industrial Engineering Chemistry" vol. 16 (1924) pp. 362. The Williams "Y" value is the thickness of a 2 cc. pellet after a definite time in the plastometer at a stated temperature. This value is a measurement of the plasticity, the lower the value the more plastic the composition. After removing the pellet from the plastometer, its thickness is usually measured again after a definite period of time, for example, 1 minute. The difference between the "Y" value and the recovered thickness gives a measure of the recovery of the plasticized composition and provides another means of comparing the action of various chemicals on rubber. Another measure which has come to be a commercial accepted standard indication is known as the "Mooney" value.

The invention will be described in conjunction with the following examples which are meant to be illustrative only and not by way of limitation. Where the "Y" value is indicated in the following examples it has the meaning described thereto in the above identified publication. All parts are by weight unless otherwise noted.

*Example 1*

25 parts of di(aminophenyl)disulfide, 30 parts of thenoyl chloride, and 50 parts of pyridine are combined and allowed to stand until reaction substantially ceases and the mixture is at about room temperature. On pouring into water a crystalline product appears. The crystals are collected and purified by recrystallization from a mixture of equal parts of ethanol and cellosolve. The product, o,o-di(thenamido)diphenyldisulfide is a yellow, needle-like crystalline mass melting at 150°–152° C. (unc.).

*Example 2*

Repeating the procedure of Example 1 using di(aminophenyl)disulfide and furoyl chloride in the molar ratio of 1–2 with a slight excess of furoyl chloride produces o,o'-di(furamido)diphenyldisulfide as a yellowish mass of needle-like crystals melting at 152°–154° C. (unc.).

Example 3

25 parts of nicotinic acid and 50 parts SOCl₂ are combined and heated for several hours on a steam bath, after which the excess thionyl chloride is removed by distillation under reduced pressure. To the residue is added a solution of 25 parts of o,o'-di(aminodiphenyl) disulfide in 70 parts of an equal mixture by volume of pyridine and benzene, the mixture being combined with stirring at room temperature. It is then heated for about ½ hour on a steam bath and the excess solvent is removed under reduced pressure. The residue is washed with ice-water until it crystallizes on standing, and the crystals are recrystallized from ethanol. The product o,o'-di(nicotinamido) diphenyldisulfide softens at 148° C. and melts at 152°–154° C. (unc.).

By simple substitution of the m,m'- or p,p'-diaminodiphenyldisulfide the corresponding dinicotinoyl derivative is obtained.

The effectiveness as a plasticizer of the compounds of the present invention may be shown by comparison of o,o'-dibenzamidodiphenyldisulfide, perhaps the best of the currently commercially-available plasticizers. Illustrative tests are shown in the following examples:

Example 4

|  | 250 gm. Batch GR-S, Banbury jacket at 307° F.; Banbury rotors at 212° F. | | | |
| --- | --- | --- | --- | --- |
|  | 1 | 2 | 3 | 4 |
| GR-S | 100 | 100 | 100 | 100 |
| o,o'-dibenzamidodiphenyldisulfide |  | 1.5 |  |  |
| o,o'-dithenoylamidodiphenyldisulfide |  |  | 1.5 |  |
| o,o'-difuramidodiphenyldisulfide |  |  |  | 1.5 |
| Plasticizer added at min |  | 0.5 | 0.5 | 0.5 |
| Total time in Banbury—min | 6 | 6 | 6 | 6 |
| Plasticity Tests | | | | |
| Williams 3 Min. "Y" at 100° C.—Mils | 117 | 95 | 93 | 93 |
| 1 Min. Recovery at 100° C.—Mils | 47 | 28 | 22 | 25 |

Example 5

|  | 250 gm. Batch GR-S, Banbury Jacket at 307° F.; Banbury Rotors at 212° F. | | |
| --- | --- | --- | --- |
|  | 5 | 6 | 7 |
| GR-S | 100 | 100 | 100 |
| o,o'-dibenzamidodiphenyldisulfide |  | 1.5 |  |
| o,o'-dinicotinoylamidodiphenyldisulfide |  |  | 1.5 |
| Plasticizer added at Min |  | 0.5 | 0.5 |
| Total Time in Banbury—Min | 6 | 6 | 6 |
| Plasticity Tests | | | |
| Williams 3 Min. "Y" at 100° C.—Mils | 118 | 91 | 89 |
| 1 Min. Recovery at 100° C.—Mils | 47 | 28 | 24 |

I claim:

1. A process of increasing the rate of plasticizing an unvulcanized elastomer selected from the group consisting of vulcanizable natural rubber and synthetic rubber-like polymers of conjugated diolefinic monomers capable of being plasticized by hot mastication in the presence of oxygen, which comprises admixing the elastomer with from 0.025–5% of an o,o'-disubstituted-diphenyldisulfide having the type formula

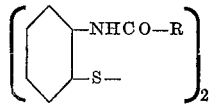

wherein COR is selected from the group of the thenoyl, furoyl, and nicotinoyl radicals, and treating the mixture at temperatures of from 100°–165° C. for sufficient time to effect the desired plasticity.

2. A process according to claim 1 in which the diphenyldisulfide is incorporated at temperatures of from 100°–165° C.

3. A process according to claim 1 in which the diphenyldisulfide is incorporated at a temperature below 100° C. and the mixture is subsequently treated for a short period of time by heating to 100°–165° C.

4. A plasticized elastomer comprising an unvulcanized elastomer selected from the group consisting of vulcanizable natural rubber and synthetic rubber-like polyers of conjugated diolefinic monomers capable of being plasticized by hot mastication in the presence of oxygen, admixed with from 0.025–5% of an o,o'-disubstituted-diphenyldisulfide having the type formula

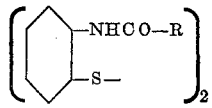

in which COR is selected from the group of the thenoyl, furoyl, and nicotinoyl radicals, and treating the mixture at temperatures of from 100°–165° C. for sufficient time to effect the desired plasticity.

5. A composition according to claim 4 in which in the plasticizer COR is thenoyl.

6. A composition according to claim 4 in which in the plasticizer COR is furoyl.

7. A composition according to claim 4 in which in the plasticizer COR is nicotinoyl.

8. A vulcanizate comprising a vulcanized composition of an unvulcanized elastomer selected from the group consisting of vulcanizable natural rubber and synthetic rubber-like polymers of conjugated diolefinic monomers capable of being plasticized by hot mastication in the presence of oxygen, admixed with from 0.025–5% of an o,o'-disubstituted-diphenyldisulfide having the type formula

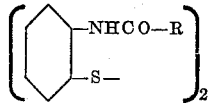

in which COR is selected from the group of the thenoyl, furoyl, and nicotinoyl radicals, and treating the mixture at temperatures of from 100°–165° C. for sufficient time to effect the desired plasticity.

EDWIN OSCAR HOOK.

REFERENCES CITED

The following references are of record in the file of this patent:

UNITED STATES PATENTS

| Number | Name | Date |
| --- | --- | --- |
| 2,470,945 | Paul | May 24, 1949 |

OTHER REFERENCES

Davis, Ind. and Eng. Chem., vol. 39, No. 1, January 1947, pp. 94 to 100.

Certificate of Correction

Patent No. 2,530,355 November 14, 1950

EDWIN OSCAR HOOK

It is hereby certified that error appears in the printed specification of the above numbered patent requiring correction as follows:

Column 4, line 30, for "plastomer" read *plastometer*; line 65, for "o,o-di(thenamido)diphenyldisulfide" read *o,o'-di(thenamido)diphenyldisulfide*; column 6, line 24, for "polyers" read *polymers*;

and that the said Letters Patent should be read as corrected above, so that the same may conform to the record of the case in the Patent Office.

Signed and sealed this 27th day of March, A. D. 1951.

[SEAL]

THOMAS F. MURPHY,
*Assistant Commissioner of Patents.*